(12) United States Patent
Kusano (10) Patent No.: US 7,663,093 B2
(45) Date of Patent: Feb. 16, 2010

(54) ABSOLUTE POSITION ENCODER HAVING A SECOND INCREMENTAL TRACK INTEGRATED WITH THE ABSOLUTE TRACK

(75) Inventor: Kouhei Kusano, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/141,529

(22) Filed: Jun. 18, 2008

(65) Prior Publication Data

US 2008/0315076 A1    Dec. 25, 2008

(30) Foreign Application Priority Data

Jun. 19, 2007    (JP) .............................. 2007-161776

(51) Int. Cl.
*G01D 5/34* (2006.01)
(52) U.S. Cl. .............................. 250/231.18; 250/231.13; 341/11; 356/617
(58) Field of Classification Search ................ 250/ 231.13–231.18; 341/11, 13, 31; 359/436–442; 356/616–619; 33/1 PT, 1 N
See application file for complete search history.

(56) References Cited

U.S. PATENT DOCUMENTS

| | | | |
|---|---|---|---|
| 4,914,437 A * | 4/1990 | Kibrick et al. ................ 341/3 |
| 5,003,171 A * | 3/1991 | Paley ..................... 250/231.14 |
| 2005/0236560 A1* | 10/2005 | Ch'ng et al. ........... 250/231.13 |
| 2008/0111061 A1* | 5/2008 | Wong et al. ............ 250/231.13 |

FOREIGN PATENT DOCUMENTS

JP    07-286861    10/1995

* cited by examiner

*Primary Examiner*—Thanh X Luu
*Assistant Examiner*—Francis M Legasse, Jr.
(74) *Attorney, Agent, or Firm*—Rankin, Hill & Clark LLP (57) ABSTRACT

A scale has a first incremental track with first incremental patterns including first light and dark patterns formed at equal intervals in first periods, an absolute track with absolute patterns representing absolute positions, and a second incremental track with second incremental patterns including second light and dark patterns formed at equal intervals in second periods longer than the first periods. A light source emits a measurement light to the scale. A photodetector receives the measurement light reflected at or transmitted through the scale. A signal processing circuit processes the received light signal of the photodetector to detect an absolute position of the scale.

7 Claims, 11 Drawing Sheets

ABS/Incremental Integrated Patterns 34

ABS/Incremental Photodiode Array 44

FIG. 8B

Light and Dark Signal of ABS /Incremental Integrated Patterns 34

FIG. 8C

Light and Dark Signal of ABS /Incremental Integrated Patterns 34 After Low Pass Filter Process

FIG. 8D

Light and Dark Signal After Subtraction Process

Signal strength becomes zero in those regions where no absolute pattern exists, which makes no contribution to the INC2 position detection.

Direction of Length-Measurement

FIG. 16

ABSOLUTE POSITION ENCODER HAVING A SECOND INCREMENTAL TRACK INTEGRATED WITH THE ABSOLUTE TRACK

CROSS REFERENCE TO RELATED APPLICATIONS

This application is based on and claims the benefit of priority from prior Japanese Patent Application No. 2007-161776, filed on Jun. 19, 2007, the entire contents of which are incorporated herein by reference.

BACKGROUND OF THE INVENTION

1. Field of the Invention

The present invention relates to an absolute position encoder.

2. Description of the Related Art

Incremental encoders and absolute encoders are known as devices for measuring travel distances of objects. The incremental encoders measure relative travel distances and absolute encoders allow for absolute position length-measurement.

In the case of photoelectric encoders, the incremental encoders have incremental tracks with incremental patterns including equally spaced light and dark regions. Based on these patterns, the incremental encoders count light and dark signals to detect relative travel distances. In addition, the incremental encoders may detect absolute travel distances by detecting origin detection patterns provided separately from the above-mentioned incremental patterns with equally spaced light and dark regions, and then detecting relative travel distances from the origin. However, prior to the measurement, a scale must be moved to right and left directions in order to read origin detection patterns.

On the other hand, the absolute encoders have absolute tracks with absolute patterns representing pseudo-random codes such as M-sequence codes and detect absolute positions resulting from reading the absolute patterns for a corresponding object. Unlike the incremental encoders, the absolute encoders does not require any origin detection based on origin detection patterns and may start measurement at a current position when powered on. However, the absolute encoders have a lower detection accuracy than the incremental encoders.

As such, an absolute position encoder is known where an incremental track with equally spaced incremental patterns and an absolute track with absolute patterns representing pseudo-random codes are positioned in parallel on one scale, as disclosed in, e.g., Japanese Patent Laid-Open No. (HEI) 7-286861.

In an encoder of this type, if the pitch of incremental patterns is 40 μm, then the absolute patterns must have a position accuracy of not more than ±20 μm. However, in encoders so configured, it is difficult to form highly accurate patterns since incremental patterns and absolute patterns have a different line width and different density of patterns, respectively.

SUMMARY OF THE INVENTION

An absolute position encoder according to the present invention comprises: a scale having formed therein a first incremental track with first incremental patterns including first light and dark patterns formed at equal intervals in first periods, an absolute track with absolute patterns representing absolute positions, and a second incremental track with second incremental patterns including second light and dark patterns formed at equal intervals in second periods longer than the first periods; a light source emitting a measurement light to the scale; a photodetector receiving the measurement light reflected at or transmitted through the scale; and a signal processing circuit processing the received light signal of the photodetector to detect an absolute position of the scale.

In one aspect, the signal processing circuit may be configured to generate a reference position signal, the reference position signal having periods of the least common multiple between a pitch of the first incremental patterns and a pitch of the second incremental patterns, determine which one of the periods of the reference position signal the scale is located in based on a signal obtained from the absolute patterns, and detect an absolute position of the scale based on the determination result, a signal obtained from the second incremental patterns, and a signal obtained from the first incremental patterns.

In addition, in another aspect, an absolute position encoder according to the present invention comprises: a scale having formed therein a first incremental track with first incremental patterns including first light and dark patterns formed at equal intervals in first periods, an absolute track with absolute patterns representing absolute positions, and second incremental tracks, each with second incremental patterns including second light and dark patterns formed at equal intervals in second periods longer than the first periods, and each being arranged on the upper and lower sides of the first incremental track, respectively; a light source emitting a measurement light to the scale; a photodetector receiving the measurement light reflected at or transmitted through the scale; and a signal processing circuit processing the received light signal of the photodetector to detect an absolute position of the scale.

In one aspect, the signal processing circuit may generate a reference position signal, the reference position signal having periods of the least common multiple between a pitch of the first incremental patterns and a pitch of the second incremental patterns, determine which one of the periods of the reference position signal the scale is located in based on a signal obtained from the absolute patterns, and detect an absolute position of the scale based on the determination result, an average of signals obtained from the second incremental patterns, and a signal obtained from the first incremental patterns.

According to this encoder, the absolute patterns does not need to be formed precisely in relation to the incremental patterns with light and dark patterns formed therein at first periods, but rather it is sufficient to form the absolute patterns with a predetermined accuracy with respect to the reference position signals that change at periods larger than the first periods. Accordingly, the absolute patterns may accept larger position errors with respect to the incremental patterns, which may lead to more minute incremental patterns as well as improved accuracy in encoders.

DETAILED DESCRIPTION OF THE EMBODIMENTS

Embodiments of the present invention will now be described in detail below with reference to the accompanying drawings.

First Embodiment

Figure 1:
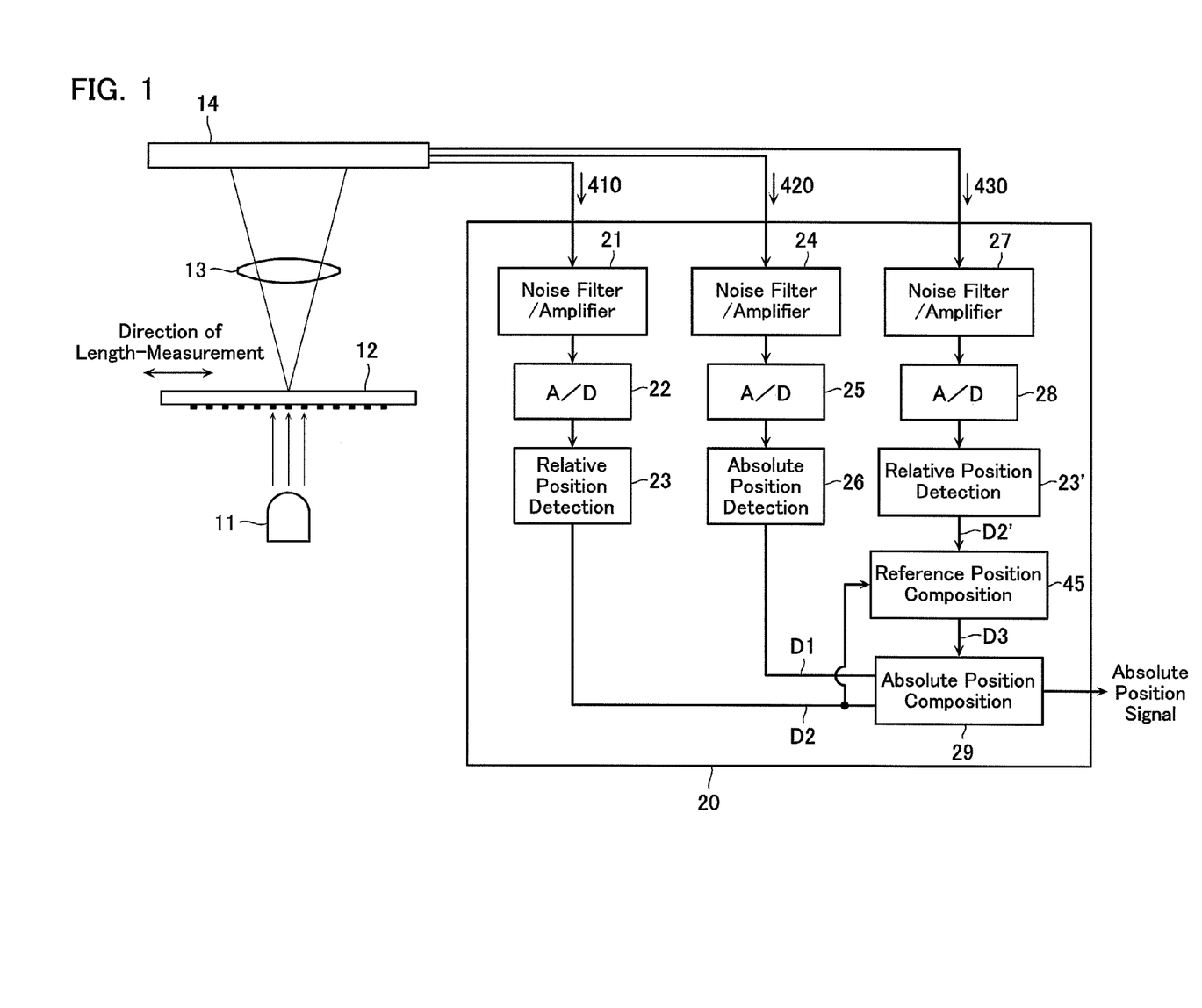
FIG. 1 is a schematic diagram illustrating an entire configuration of an absolute position length-measurement type photoelectric encoder according to a first embodiment of the present invention.

FIG. 1 is a schematic diagram illustrating an entire configuration of an absolute position length-measurement type photoelectric encoder according to a first embodiment of the present invention. The absolute position length-measurement type photoelectric encoder according to this embodiment comprises a light-emitting element 11, a scale 12, a lens 13, a photodiode array 14, and a signal processing circuit 20.

Figure 2A:
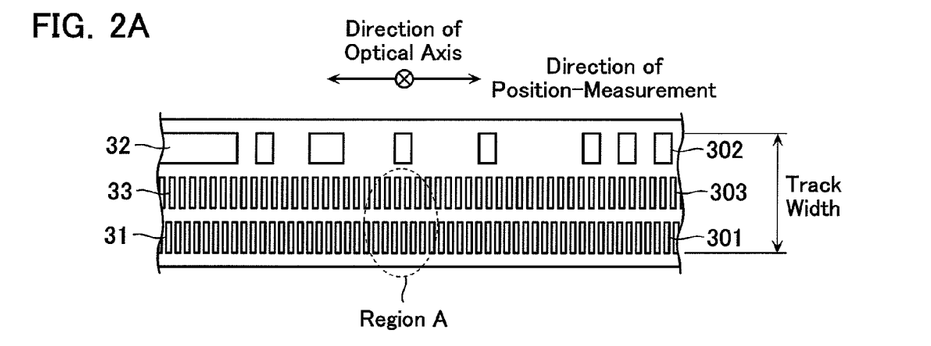
FIGS. 2A and 2B are a plan view illustrating a configuration of the scale 12 in FIG. 1.

The light-emitting element 11 is a light source, such as a laser diode, that emits a coherent light. As illustrated in FIG. 2A, the scale 12 is configured to form the following tracks on a transparent glass substrate: a first incremental track 301 with first incremental patterns 31 formed at an arrangement pitch P1 (e.g., 40 μm) that include equally spaced light and dark regions; an absolute track 302 with general absolute patterns 32 that represent absolute positions in pseudo-random patterns (in this case, M-sequence codes); and a second incremental track 303 with second incremental patterns 33 formed at an arrangement pitch P2 (e.g., 50 μm) slightly larger than that of the first incremental patterns.

Figure 2B:
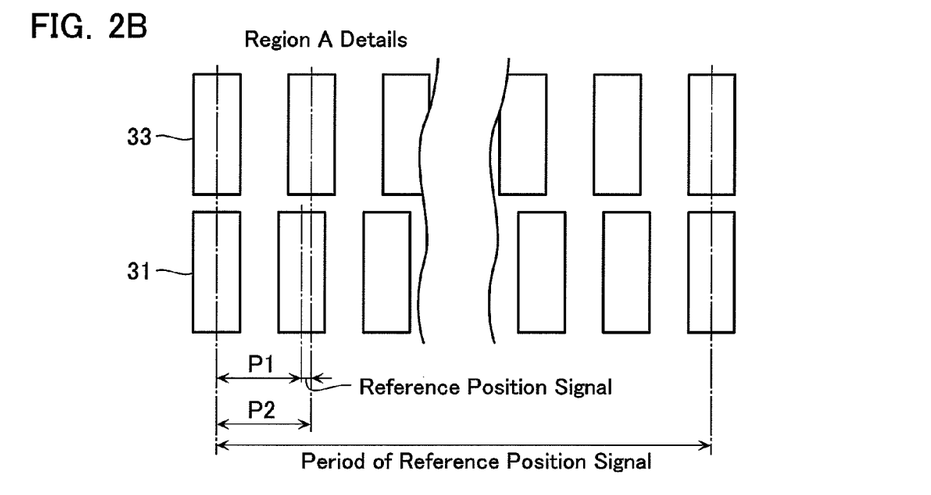

A relationship between the first incremental patterns 31 and the second incremental patterns 33 will be described in detail below. FIG. 2B illustrates an enlarged region (region A) of the scale 12. The pitch P2 of the second incremental patterns 33 is slightly larger than the pitch P1 of the first incremental patterns 31. A reference position signal is configured by a phase difference between the first incremental patterns 31 and the second incremental patterns 33. A reference position signal has such a phase that changes at predetermined periods along the sweeping direction. In this case, each of the periods of the reference position signal is configured to be the least common multiple between the pitch P1 of the first incremental patterns 31 and the pitch P2 of the second incremental patterns. For example, provided that the pitch P1 of the first incremental patterns 31 is 40 μm and the pitch P2 of the second incremental patterns is 50 μm, each of the periods of the corresponding reference position signal is 200 μm.

With this configuration, substantially the same line width and density may be provided for the first incremental patterns 31 and the second incremental patterns 33. In addition, since both the first incremental patterns 31 and the second incremental patterns 33 can be formed with a transcription method using a step-and-repeat scheme in lithography technology, highly accurate scale patterns may be formed in a more simple fashion. In contrast, since none of the regions in the absolute patterns 32 is the same throughout the length, the absolute patterns 32 are difficult to form in an accurate fashion throughout the length of the encoder.

In this case, it is assumed here that, as in the conventional art, an encoder having only first incremental patterns 31 and absolute patterns 32, without any reference position signal. According to this encoder, for example, provided that the arrangement pitch of the first incremental patterns 31 is 40 μm, then the absolute patterns 32 must have an accuracy less than one-half of the arrangement pitch, i.e., less than ±20 μm, throughout the length of the scale 12.

As in this embodiment, if such a reference position signal is generated that changes at periods larger than the arrangement pitch P1 of the first incremental patterns 31, such a position accuracy is sufficient for the absolute patterns 32 that is set to the same level as the periods of the reference position signal. In this way, the absolute patterns 32 may accept larger position errors. For example, if each of the periods of the reference position signal is five times larger than P1, i.e., 200 μm, then those position errors up to ±100 μm may be accepted in the absolute patterns 32 throughout the length of the scale 12. This means that the arrangement pitch P1 of the first incremental patterns 31 can be determined regardless of the accuracy of the absolute patterns 32. Therefore, this embodiment may provide a more minute pitch of the first incremental patterns 31, which would provide improved accuracy in the encoder.

The light-emitting element 11 emits the scale 12. Then, the irradiated light transmitted through the scale 12 is projected through the lens 13 onto the photodiode array 14.

Figure 3:
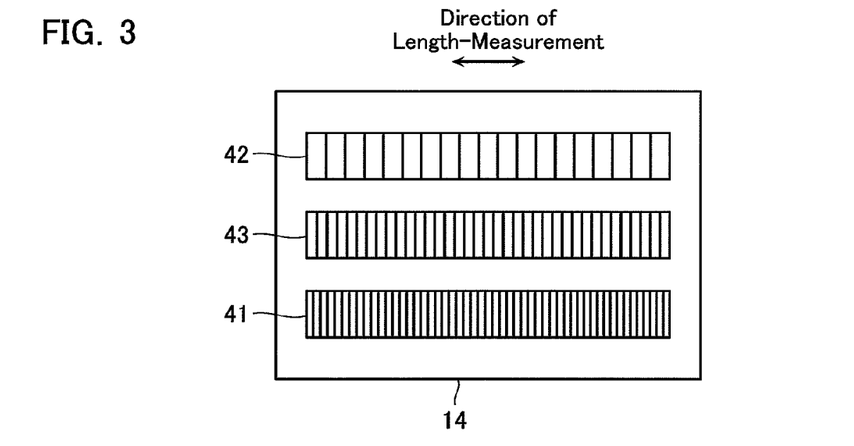
FIG. 3 is a plan view illustrating a configuration of the photodiode array 14 in FIG. 1.

As illustrated in FIG. 3, the photodiode array 14 comprises a first INC photodiode array 41, an ABS photodiode array 42, and a second INC photodiode array 43, corresponding to the first incremental track 301, the absolute track 302, and the second incremental track 303, respectively. Each of the photodiode arrays 41 to 43 is configured to arrange photodiodes therein at a respective arrangement pitch corresponding to each of the corresponding patterns 31 to 33.

The first INC photodiode array 41 has four sets of photodiode arrays, each with a phase difference of 90°, respectively, and detects light and dark signals based on the first incremental patterns 31 to output a quadrature sine wave signal 410 with a phase difference of 90°. The second INC photodiode array 43 detects light and dark signals based on the second incremental patterns 33 to output a quadrature sine wave signal 430 with a phase difference of 90°. The ABS photodiode array 42 outputs a signal 420 resulting from sweeping light and dark signals based on the absolute patterns 32 in a direction of length-measurement.

Now returning to FIG. 1, further description will be given below. By way of an example, a signal processing device 20 comprises a noise filter/amplifier circuit 21, an A/D converter 22, relative position detection circuits 23 and 23', a noise filter/amplifier circuit 24, an A/D converter 25, an absolute position detection circuit 26, a noise filter/amplifier circuit 27, an A/D converter 28, a absolute position composition circuit 29, and a reference position generation circuit 45.

The noise filter/amplifier circuit 21 removes any noise in an analog output signal 410 (a quadrature signal with a phase difference of 90°) provided by the INC photodiode array 41. Then, the noise filter/amplifier circuit 21 amplifies and outputs the analog output signal 410. The A/D converter 22 converts the analog output signal output from the noise filter/amplifier circuit 21 to a digital signal. Through an arctan operation on the amplitude of the resulting digital signal (digitized two-phase signal with a phase difference of 90°), the relative position detection circuit 23 outputs a relative position signal D2 that indicates a relative travel distance and a travel direction of the scale 12.

The noise filter/amplifier circuit 27 removes any noise in an analog output signal 430 provided by the second INC photodiode array 43. Then, the noise filter/amplifier circuit 27 amplifies and outputs the analog output signal 430. The A/D converter 28 converts the analog output signal output from the noise filter/amplifier circuit 27 to a digital signal. Through an arctan operation on the amplitude of the resulting digital signal (digitized two-phase signal with a phase difference of 90°), the relative position detection circuit 23' outputs a relative position signal D2' that indicates a relative travel distance and a travel direction of the scale 12. The above-mentioned reference position signal D3 may be obtained through a phase comparison between the resulting relative position signals D2 and D2' at the reference position generation circuit 45.

The noise filter/amplifier circuit 24 removes any noise in an analog output signal (absolute position signal) 420 provided by the ABS photodiode array 42. Then, the noise filter/amplifier circuit 24 amplifies and outputs the analog output signal. The A/D converter 25 converts the analog output signal output from the noise filter/amplifier circuit 24 to a digital signal. In this case, the converted digital signal includes data of M-sequence codes represented by the absolute patterns 32.

The absolute position detection circuit 26 has a table (not illustrated) that indicates a relationship between the M-sequence codes and absolute positions represented by the M-sequence. The absolute position detection circuit 26 refers to the table to output an absolute position signal D1 that indicates an absolute position of the scale 12. Alternatively, the absolute position detection circuit 26 outputs such an absolute position signal D1 through a correlation operation between a designed value of the absolute patterns and the detected signal.

Based on the absolute position signal D1, relative position signal D2, and reference position signal D3, the absolute position composition circuit 29 calculates minute absolute positions of the scale 12.

Figure 4A:
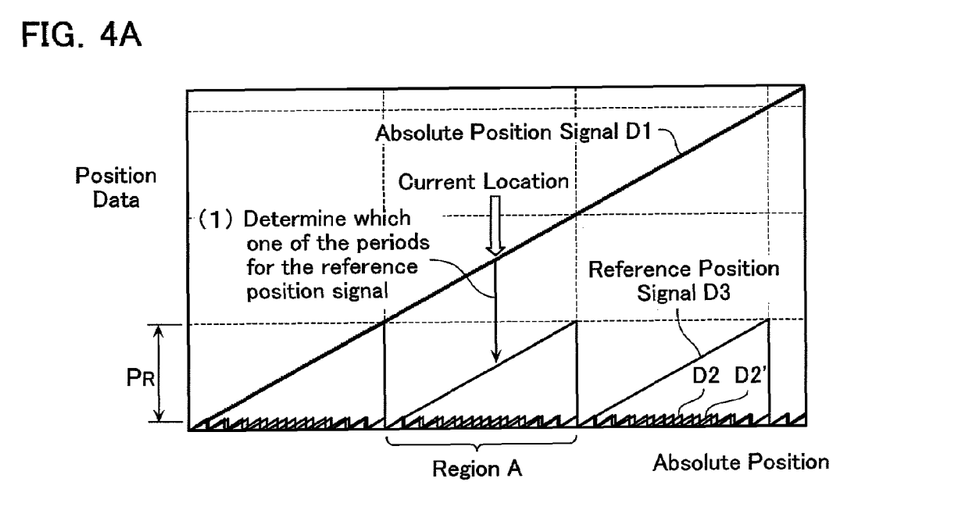
FIGS. 4A and 4B are a conceptual diagram illustrating operations of the absolute position length-measurement type photoelectric encoder according to the first embodiment.

Referring now to FIG. 4A and FIG. 4B, operations of the absolute position composition circuit 29 will be described below. The absolute position signal D1 has information for absolute positions of the scale 12. The absolute patterns 32 are formed with a predetermined accuracy with respect to the reference position signal D3. Thus, it is possible to determine which one of periods of the reference position signal D3 the scale 12 is located in, by obtaining absolute positions from the absolute position signal D1 ((1) of FIG. 4A).

Figure 4B:
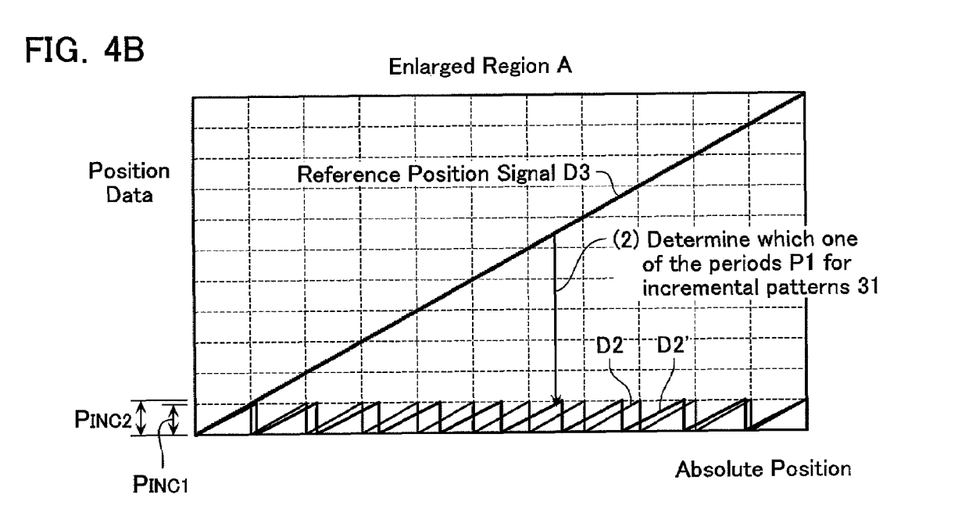

After the one of the periods is determined for the reference position signal D3, the amount of signal for the reference position signal D3 is detected. Then, it is possible to determine which period the scale 12 is located in for the first incremental patterns 31 ((2) of FIG. 4B). Thereafter, absolute positions of the scale 12 may be calculated and output by counting light and dark regions of the relative position signal D2 obtained from the first incremental patterns 31.

As can be seen from the above, according to this embodiment, an absolute position of the scale 12 is detected in relation to the reference position signal D3, based on the absolute position signals D1 obtained from the absolute patterns 32. Then, elaborate absolute position information of the scale 12 may be obtained, according to the reference position signal D3 and the relative position signal D2 based on the first incremental patterns 31. Therefore, this embodiment may provide a more minute pitch of the incremental patterns, which would provide improved accuracy in the absolute length-measurement encoder.

Second Embodiment

Referring now to FIGS. 5 through 8, an absolute position length-measurement type photoelectric encoder according to a second embodiment of the present invention will be described below. In FIGS. 5 through 8, the same reference numerals represent the same components as the first embodiment and detail description thereof will be omitted herein.

Figure 5:
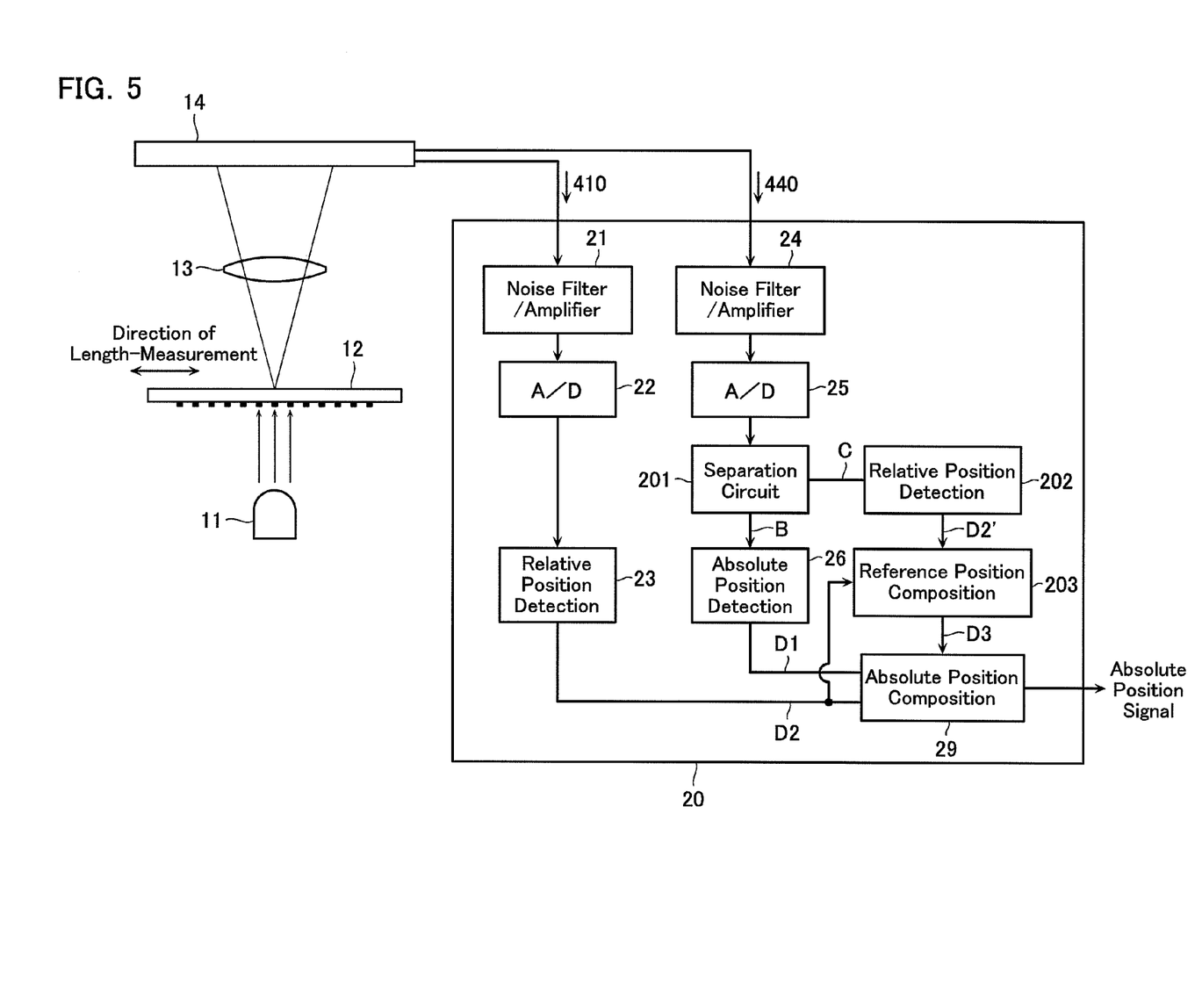
FIG. 5 is a schematic diagram illustrating an entire configuration of an absolute position length-measurement type photoelectric encoder according to a second embodiment of the present invention.
Figure 6A:
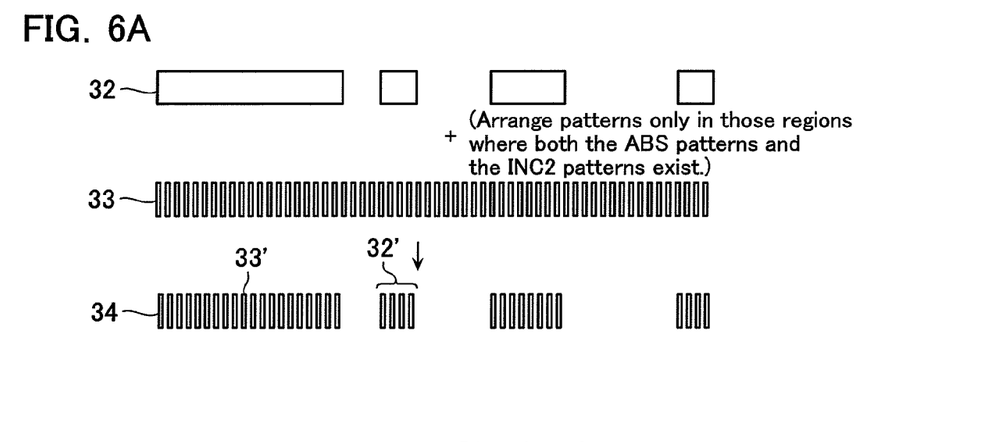
FIGS. 6A and 6B are a plan view illustrating a configuration of the scale 12 in FIG. 5.
Figure 6B:
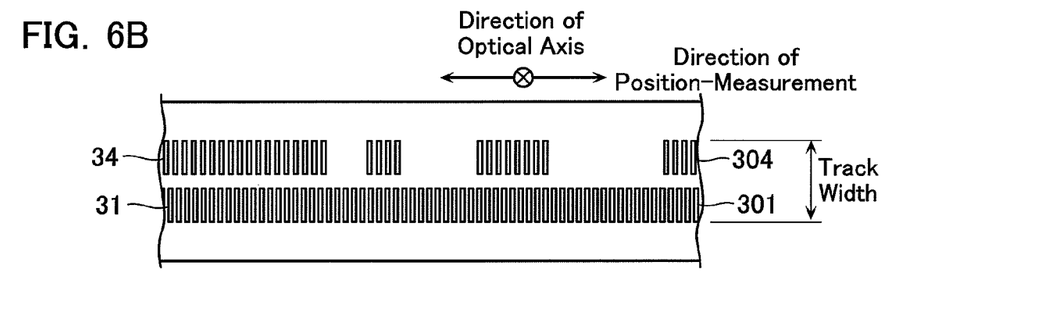

FIG. 5 is a schematic diagram illustrating an entire configuration of the second embodiment, and FIG. 6 illustrates a plan configuration of the scale 12. This embodiment differs from the first embodiment in that, as illustrated in FIG. 6B, it comprises, instead of the absolute track 302 and the second incremental track 303 of the first embodiment, an ABS/incremental integrated track 304 with ABS/incremental integrated patterns 34, wherein those two types of patterns, i.e., the absolute patterns 32 and the incremental patterns 33 are integrated into one track. As illustrated in FIG. 6A, the ABS/incremental integrated patterns 34 are formed with the following two types of patterns integrated and arranged in one track: absolute patterns 32 representing pseudo-random patterns and second incremental patterns 33 arranged at an arrangement pitch P2 larger than the arrangement pitch P1 of the first incremental patterns 31. Specifically, the ABS/incremental integrated patterns 34 are configured to form patterns only in those regions where both the absolute patterns 32 and the second incremental patterns 33 exist. In addition, the ABS/incremental integrated patterns 34 include absolute pattern areas 32' corresponding to the absolute patterns 32 and second incremental pattern areas 33' corresponding to the second incremental patterns 33.

In this embodiment, as described above, since the scale 12 involves only two tracks, the scale 12 may be easily made smaller in comparison to the first embodiment where three tracks are involved.

Figure 7:
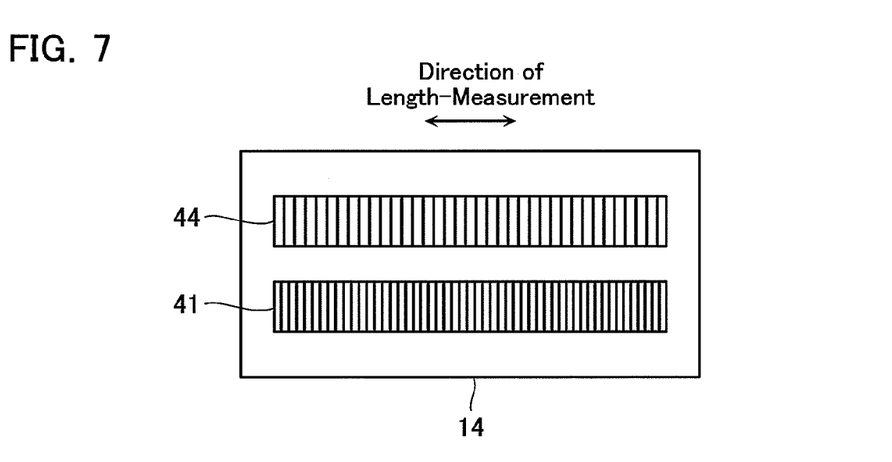
FIG. 7 is a plan view illustrating a configuration of the photodiode array 14 in FIG. 5.

As illustrated in FIG. 7, corresponding to the scale 12 configured as above, the photodiode array 14 includes an INC photodiode array 41 and an ABS/incremental photodiode array 44 corresponding to each of the first incremental patterns 31 and the ABS/incremental integrated patterns 34.

As illustrated in FIG. 5, the signal processing circuit 20 of this embodiment has a configuration similar to the first embodiment for signal processing (21 to 23) based on the incremental patterns 31. On the other hand, the signals 440 based on the ABS/incremental integrated patterns 34 as mentioned above are different from the first embodiment in that they are input to a separation circuit 201 via the noise filter/amplifier circuit 24 and the A/D converter 25. The separation circuit 201 has a function of separating a signal provided from the second incremental pattern areas 33' from another provided from the absolute pattern areas 32' in the ABS/incremental integrated patterns 34. Specifically, the separation circuit 201 has a low-pass filter, a subtraction circuit, etc., not illustrated. For example, a signal from the second incremental pattern areas 33' is first removed with the low-pass filter from a light and dark signal of the ABS/incremental integrated patterns 34, thereby obtaining an absolute light and dark signal. Then, the obtained absolute light and dark signal is subtracted from the light and dark signal of the ABS/incremental integrated patterns 34, thereby obtaining a second incremental light and dark signal.

Referring now to FIG. 8, a method for processing signals of the ABS/incremental integrated patterns 34 will be described in detail below. FIG. 8A illustrates a relationship between the ABS/incremental photodiode array 44 and the ABS/incremental integrated patterns 34. FIG. 8B illustrates a light and dark signal 440 of the ABS/incremental integrated patterns 34 obtained at the ABS/incremental photodiode array 44 through a sweeping operation in a measurement-axis direction. The vertical axis represents signal strength and the horizontal axis represents sweeping direction. It can be seen that a signal A contains both an absolute light and dark signal and an incremental light and dark signal. FIG. 8C illustrates a light and dark signal after a low-pass filter process. Through the low-pass filter process, the incremental light and dark signal is removed and only an absolute light and dark signal B is left. As such, the absolute light and dark signal B may be separated and obtained. The absolute light and dark signal B is sent to the absolute position detection circuit 26. FIG. 8D illustrates a signal C resulting from subtraction of the absolute light and dark signal B in FIG. 8C from the light and dark signal A of the ABS/incremental integrated patterns 34 in FIG. 8B through a subtraction process. In the signal C, signal strength becomes zero in those regions where no absolute pattern area 32' exists, which makes no contribution to the incremental position detection. Thus, only the incremental light and dark signal C may be separated. This incremental light and dark signal C obtained from the separation is sent to a relative position detection circuit 202.

Figure 8A:
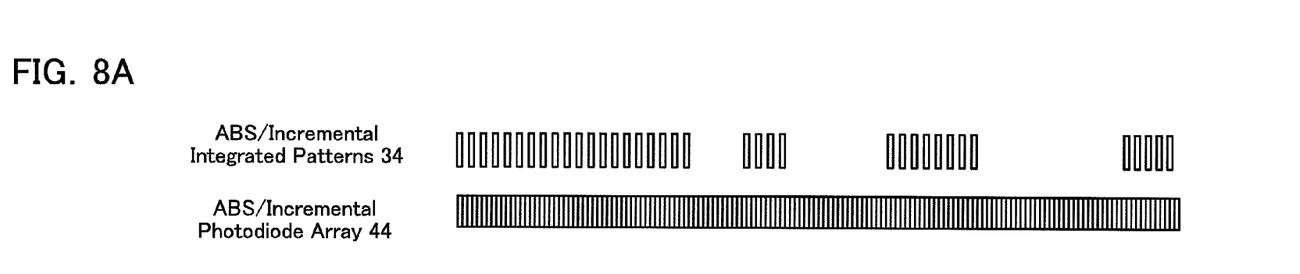
FIGS. 8A through 8D illustrate operations of the signal separation circuit in FIG. 5.
Figure 8B:
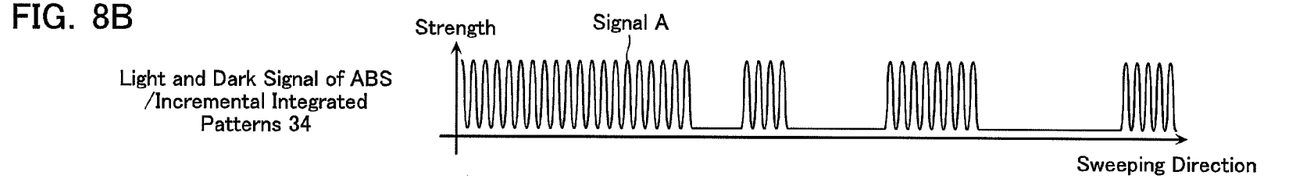
Figure 8C:
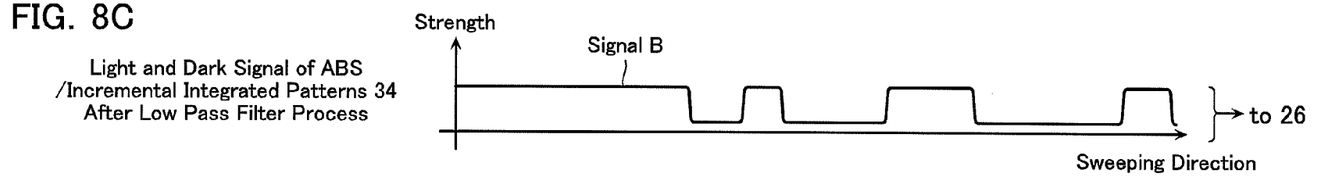
Figure 8D:
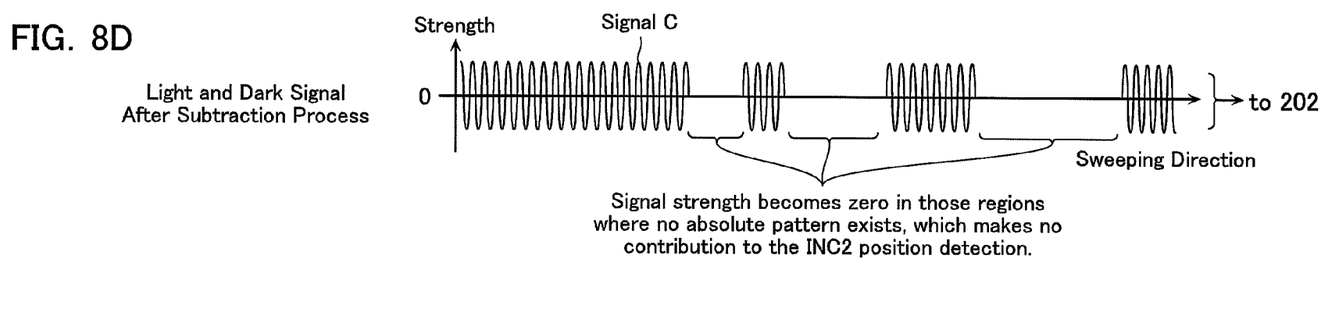

The separated signal C from a second incremental pattern area 33' is input to the relative position detection circuit 202, which in turn outputs a relative position signal D2'. A reference position signal D3 may be obtained through a phase comparison between the obtained relative position signals D2 and D2' at a reference position signal generation circuit 203. The operations of the absolute position composition circuit 29 are the same as the first embodiment.

According to this configuration, not only the reduction in track width, but also the absolute position detection may be achieved using a smaller number of types of photodiode arrays than the number of types of patterns. As a result, improved accuracy in measurement as well as reduction in size of devices and costs may be achieved.

Third Embodiment

Referring now to FIGS. 9 through 12, an absolute position length-measurement type photoelectric encoder according to a third embodiment of the present invention will be described below. In FIGS. 9 through 12, the same reference numerals represent the same components as the first embodiment and detail description thereof will be omitted herein.

Figure 9:
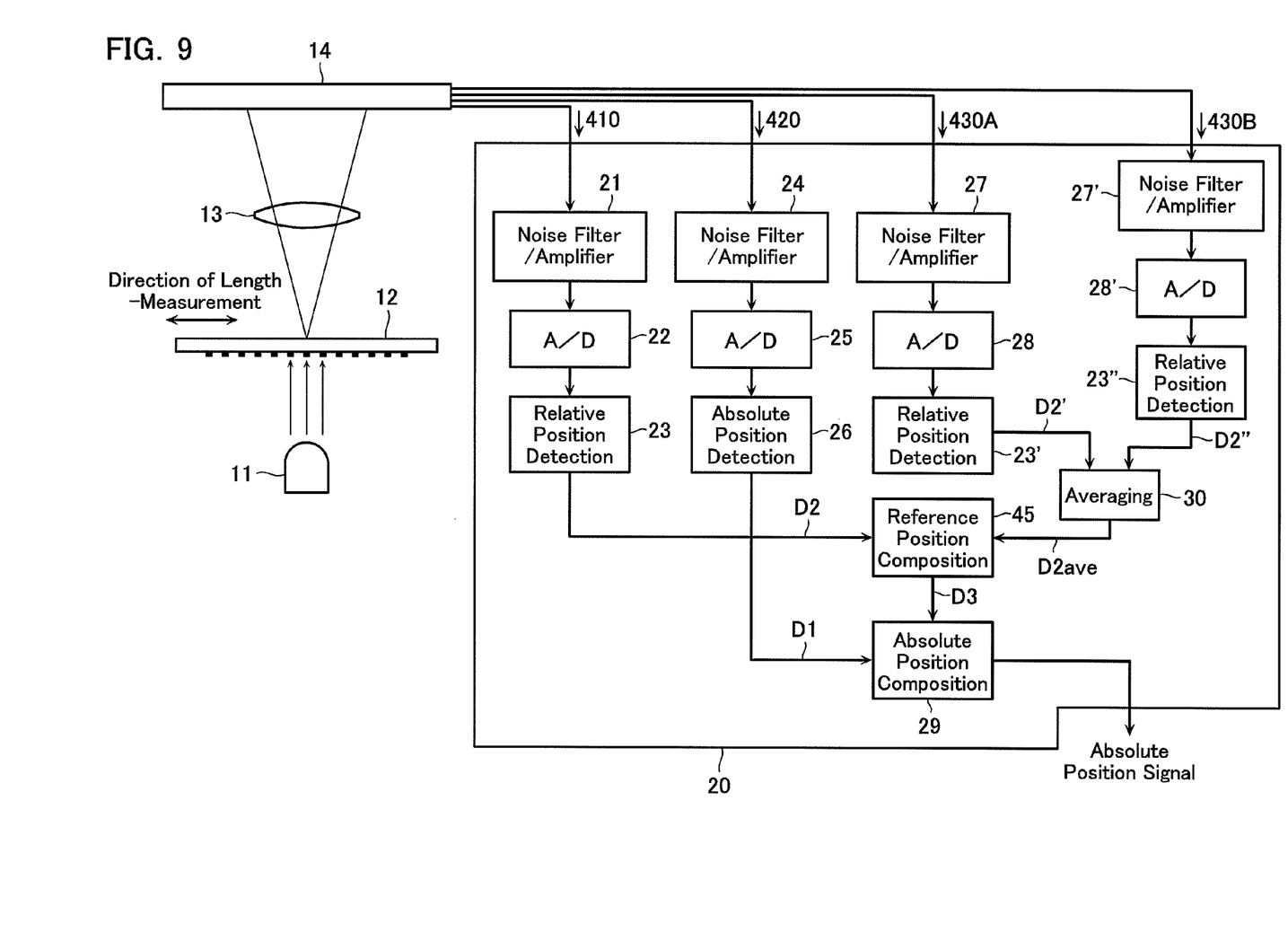
FIG. 9 is a schematic diagram illustrating an entire configuration of an absolute position length-measurement type photoelectric encoder according to a third embodiment of the present invention.
Figure 10:
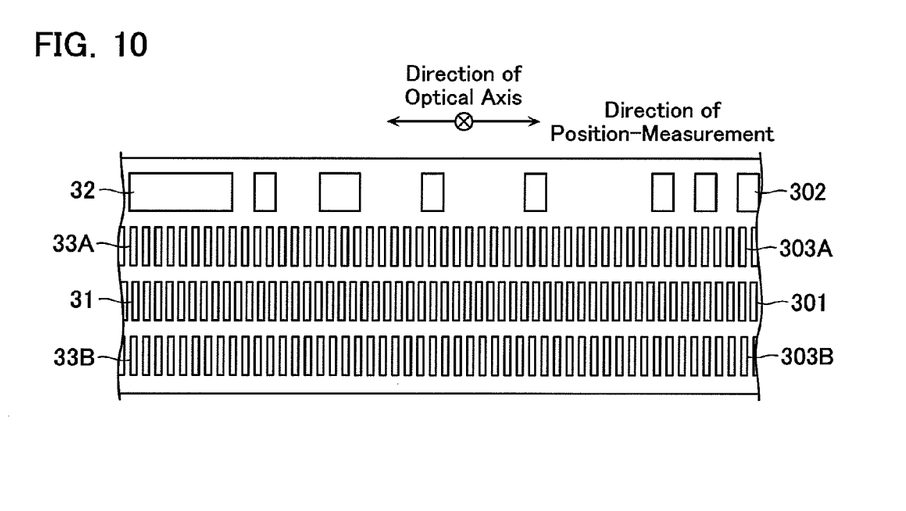
FIG. 10 is a plan view illustrating a configuration of the scale 12 in FIG. 9.

FIG. 9 is a schematic diagram illustrating an entire configuration of the third embodiment, and FIG. 10 illustrates a plan configuration of the scale 12. As illustrated in FIG. 10, the scale 12 is configured to form the following tracks on a transparent glass substrate: a first incremental track 301 with first incremental patterns 31 formed at an arrangement pitch P1 (e.g., 40 μm) that include equally spaced light and dark regions; an absolute track 302 with general absolute patterns 32 that represent absolute positions in pseudo-random patterns (in this case, M-sequence codes); and a second incremental track 303A with second incremental patterns 33A as well as a second incremental track 303B with second incremental patterns 33B, each of the second incremental tracks being formed at an arrangement pitch P2 (e.g., 50 μm) slightly larger than the arrangement pitch P1 and arranged on the upper and lower sides of the first incremental patterns 31, respectively.

The absolute position length-measurement type photoelectric encoder according to this embodiment comprises a light-emitting element 11, a scale 12, a lens 13, a photodiode array 14, and a signal processing circuit 20.

Figure 11:
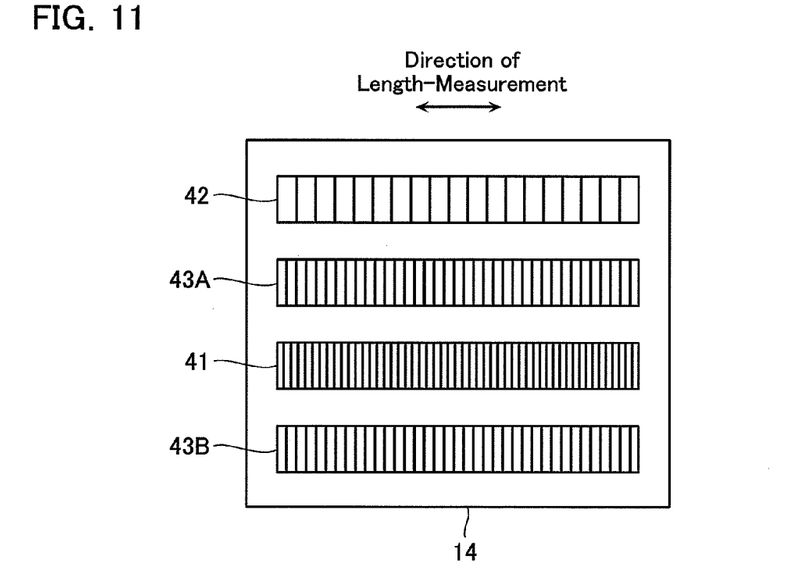
FIG. 11 is a plan view illustrating a configuration of the photodiode array 14 in FIG. 9.

As illustrated in FIG. 11, the photodiode array 14 includes a first INC photodiode array 41, an ABS photodiode array 42, and second INC photodiode arrays 43A and 43B, corresponding to the first incremental patterns 31, the absolute patterns 32, and the second incremental patterns 33A and 33B, respectively. Each of the photodiode arrays 41 to 43 is configured to arrange photodiodes therein at a respective arrangement pitch corresponding to each of the corresponding patterns 31 to 33.

The first INC photodiode array 41 has four sets of photodiode arrays, each with a phase difference of 90°, respectively, and detects light and dark signals based on the incremental patterns 31 to output a quadrature sine wave signal 410 with a phase difference of 90°. Each of the second INC photodiode arrays 43A and 43B has four sets of photodiode arrays, each with a phase difference of 90°, respectively, and detects light and dark signals based on each of the incremental patterns 33A and 33B to output quadrature sine wave signals 430A and 430B with a phase difference of 90°. The ABS photodiode array 42 outputs a signal 420 resulting from sweeping a light and dark signal based on the absolute patterns in a direction of length-measurement.

As illustrated in FIG. 9, the signal processing circuit 20 of this embodiment has a configuration similar to the first embodiment for signal processing based on the first incremental patterns 31 and the absolute patterns 32. This embodiment is different from the first embodiment in that two types of configurations are provided for signal processing based on each of the second incremental patterns 33A and 33B.

Specifically, the noise filter/amplifier circuit 27' removes any noise in an analog output signal 430B provided by the second INC photodiode array 43B. Then, the noise filter/amplifier circuit 27' amplifies and outputs the analog output signal 430B. The A/D converter 28' converts the analog signal output from the noise filter/amplifier circuit 27' to a digital signal. Through an arctan operation on the amplitude of the resulting digital signal (signal with a phase difference of 90°), a relative position detection circuit 23" outputs a relative position signal D2" that indicates a relative travel distance and a travel direction of the scale 12. A average relative position signal D2ave may be obtained through averaging of the resulting relative position signals D2 and D2" at an averaging circuit 30. A reference position signal D3 may be obtained through a phase comparison between the resulting average relative position signals D2ave and D2 at a reference position generation circuit 45, as is similar to the former embodiment.

Based on the absolute position signal D1, the relative position signal D2, and the reference position signal D3, an absolute position composition circuit 29 calculates minute absolute positions of the scale 12.

Figure 12:
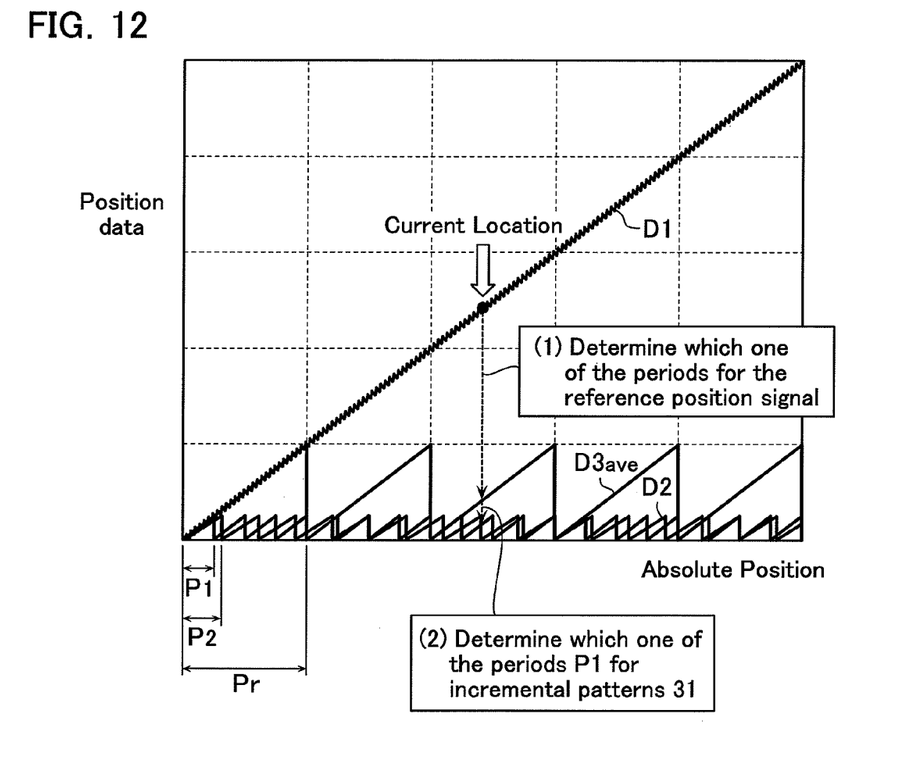
FIG. 12 is a conceptual diagram illustrating operations of the absolute position length-measurement type photoelectric encoder according to the third embodiment of the present invention.

Referring to FIG. 12, operations of the absolute position composition circuit 29 will be described below. The absolute position signal D1 has information for absolute positions of the scale 12. Since the absolute patterns 32 are formed with a predetermined accuracy with respect to the reference position signal D3, it is possible to determine which one of periods Pr the scale 12 is located in for the reference position signal D3 by obtaining absolute positions from the absolute position signal D1 ((1) of FIG. 12).

After the one of the periods Pr is determined for the reference position signal D3, a value of the reference position signal D3 is detected. Then, it is possible to determine which period the scale 12 is located in for the first incremental patterns 31 ((2) of FIG. 12). Thereafter, absolute positions of the scale 12 may be calculated and output, by counting light and dark regions of the relative position signal D2 obtained from the first incremental patterns 31.

As can be seen from the above, according to this embodiment, an absolute position of the scale 12 is detected in relation to the reference position signal D3 are based on the absolute position signals D1 obtained from the absolute patterns 32. Then, the relative position signal D2' based on the second incremental patterns 33A and the relative position signal D2" based on the second incremental patterns 33B are averaged to compensate errors in position reading. In this way, the absolute position information of the scale 12 may be obtained from the relative position signal D2 based on the first incremental patterns 31. Therefore, this embodiment may provide a more minute pitch of the incremental patterns 31 and achieve error compensation by averaging the reference position signals, which would provide improved accuracy in the absolute length-measurement type encoder.

Fourth Embodiment

Figure 13:
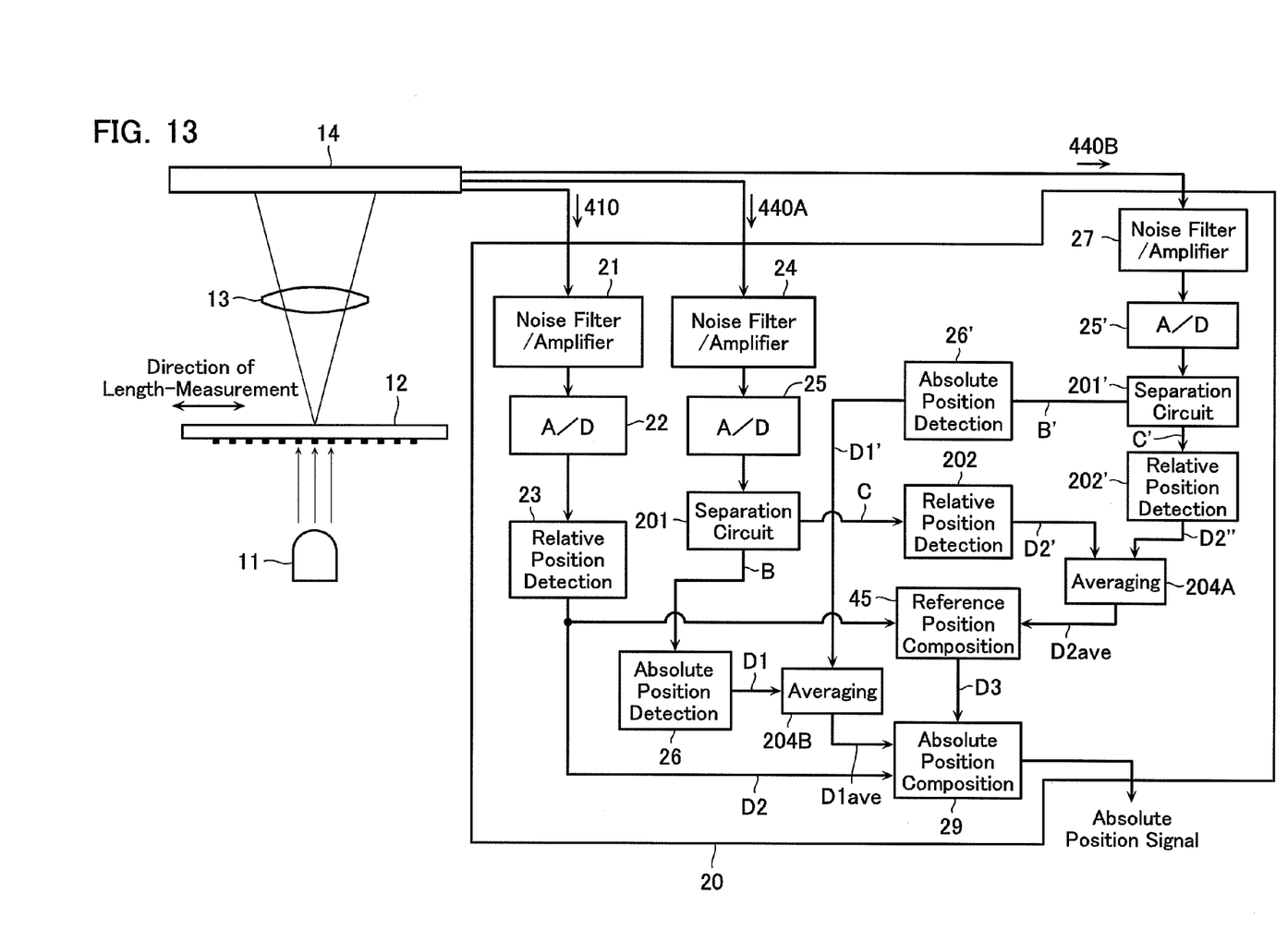
FIG. 13 is a schematic diagram illustrating an entire configuration of an absolute position length-measurement type photoelectric encoder according to a fourth embodiment of the present invention.
Figure 14:
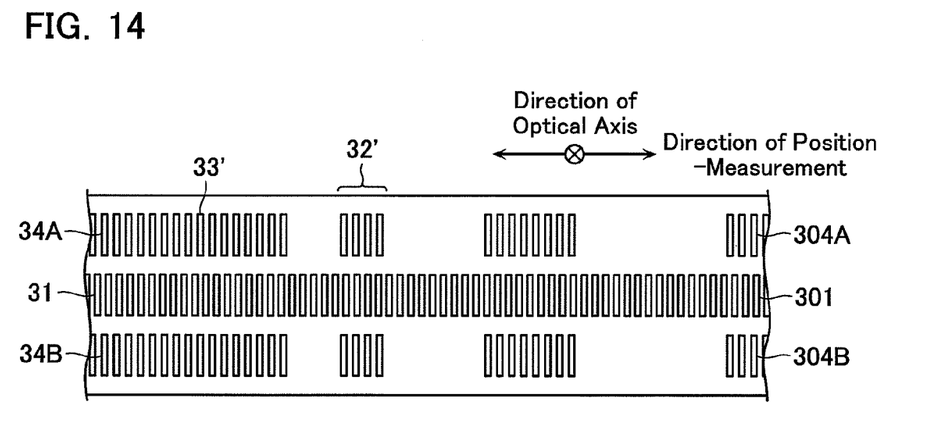
FIG. 14 is a plan view illustrating a configuration of the scale 12 in FIG. 13.
Figure 15:
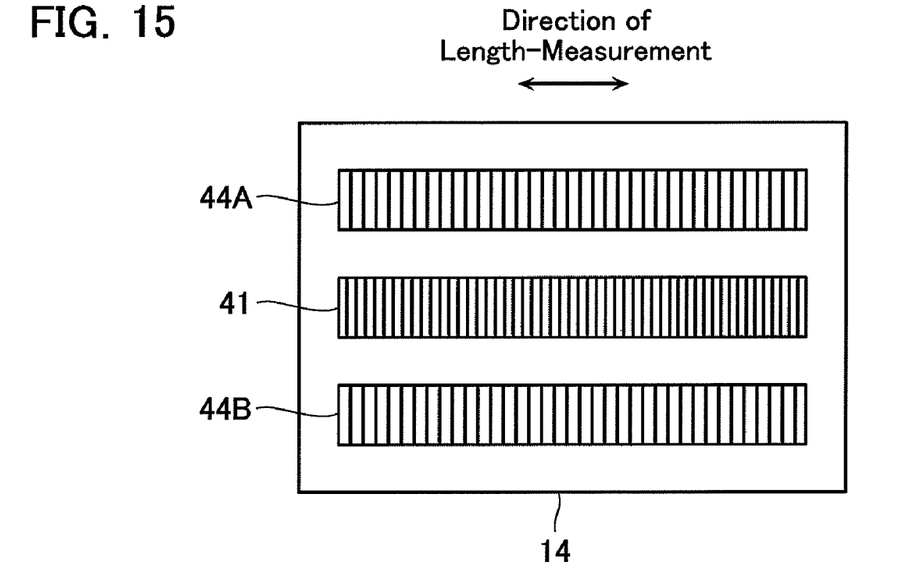
FIG. 15 is a plan view illustrating a configuration of the photodiode array 14 in FIG. 13.

Referring now to FIGS. 13 through 15, an absolute position length-measurement type photoelectric encoder according to a fourth embodiment of the present invention will be described below. In FIGS. 13 through 15, the same reference numerals represent the same components as the above-mentioned embodiments and detail description thereof will be omitted herein.

FIG. 13 a schematic diagram illustrating an entire configuration of the fourth embodiment, and FIG. 14 illustrates a plan configuration of the scale 12. This embodiment differs from the third embodiment in that, as illustrated in FIG. 14, it comprises, instead of the absolute track 302 and the second incremental tracks 303A and 303B, an ABS/incremental integrated track 304A with ABS/incremental integrated patterns 34A and an ABS/incremental integrated track 304B with ABS/incremental integrated patterns 34B, wherein those two types of patterns, i.e., the absolute patterns 32 and the second incremental patterns 33 are integrated into one track, respectively. As illustrated in FIG. 14, the ABS/incremental integrated patterns 34A and 34B are each formed with the following patterns arranged in one track: absolute patterns 32 representing pseudo-random patterns, and the second incremental patterns 33A and 33B, each arranged at an arrangement pitch P2 larger than the arrangement pitch P1 of the first incremental patterns 31. Specifically, the ABS/incremental integrated patterns 34A and 34B are each configured to form patterns only in those regions where both the absolute patterns 32 and the second incremental patterns 33 exist. In addition, the ABS/incremental integrated patterns 34A and 34B each include absolute pattern areas 32' corresponding to the absolute patterns 32 and second incremental pattern areas 33' corresponding to the second incremental patterns 33.

The scale 12 is, as a whole, configured to form three tracks in such a way that the ABS/incremental integrated tracks 304A and 304B are formed on the upper and lower sides of the first incremental track 301. In this embodiment, as described above, since the scale 12 involves only three tracks, the scale 12 may be easily made smaller in comparison to the third embodiment where four tracks are involved.

In addition, as illustrated in FIG. 15, corresponding to the scale 12 configured as above, the photodiode array 14 includes an INC photodiode array 41 and ABS/incremental photodiode arrays 44A and 44B corresponding to each of the first incremental patterns 31 and the ABS/incremental integrated patterns 34A and 34B.

As illustrated in FIG. 13, the signal processing circuit 20 of this embodiment has a configuration similar to the first embodiment for signal processing based on the first incremental patterns 31 and for separation of an incremental light and dark signal and an absolute light and dark signal from the ABS/incremental integrated patterns 34A and 34B. This embodiment is different from the second embodiment in that two types of separation systems are provided for separating an incremental light and dark signal and an absolute light and dark signal from the ABS/incremental integrated patterns 34A and 34B.

The signal from the second incremental patterns that is separated from the ABS/incremental integrated patterns 34A at a separation circuit 201 is input to a relative position detection circuit 202, which in turn outputs a relative position signal D2'. Similarly, the signal from the second incremental patterns that is separated from the ABS/incremental integrated patterns 34B at a separation circuit 201' is input to a relative position detection circuit 202', which in turn outputs a relative position signal D2".

An average relative position signal D2ave may be obtained through averaging of the resulting relative position signals D2 and D2" at an averaging circuit 204A. The average relative position signal D2ave is output to the reference position composition circuit 45.

On the other hand, the signal B from the absolute patterns that is separated from the ABS/incremental integrated patterns 34A at a separation circuit 201 is input to an absolute position detection circuit 26, which in turn outputs an absolute position signal D1.

Similarly, the signal from the absolute patterns that is separated from the ABS/incremental integrated patterns 34B at a separation circuit 201' is input to an absolute position detection circuit 26', which in turn outputs an absolute position signal D1'. An average absolute position signal D1ave may be obtained through averaging of the resulting absolute position signals D1 and D1' at an averaging circuit 204B. The average absolute position signal D1ave is output to an absolute position composition circuit 29 together with the output signal D2 from the relative position detection circuit 23.

As can be seen from the above, according to this embodiment, an absolute position of the scale 12 is detected in relation to the ABS/incremental integrated patterns 34A and 34B, based on the absolute position signal D1ave obtained from the absolute patterns 32. Then, the reference position signal D2' based on the ABS/incremental integrated patterns 34A and the reference position signal D2" based on the ABS/incremental integrated patterns 34B are averaged to compensate errors in position reading. In this way, the absolute position information of the scale 12 may be obtained from the relative position signal D2 based on the first incremental patterns 31. Therefore, this embodiment may provide a more minute pitch of the incremental patterns 31 and achieve error compensation by averaging the reference position signals, which would provide improved accuracy in the absolute length-measurement type encoder. In addition, this embodiment may achieve the reduction in number of types of photodiode arrays.

Other Embodiments

Although the embodiments of the present invention have been described as above, the present invention is not intended to be limited to the disclosed embodiments and various other changes and additions may be made thereto without departing from the scope of the invention.

Figure 16:
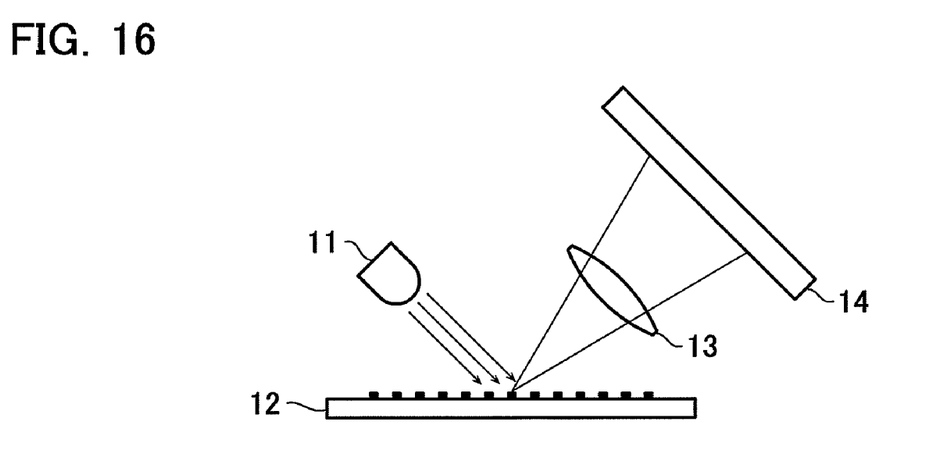
FIG. 16 illustrates a variation of the embodiments.

For example, although the above-mentioned embodiments have been described in the context of a transmissive type photoelectric encoder, as illustrated in FIG. 16, the light-emitting element 11 may be positioned at the same end as the lens 13 and the photodiode array 14 as a reflective type optical system from the scale 12.

What is claimed is:

1. An absolute position encoder comprising:
a scale having formed therein a first incremental track with first incremental patterns including first light and dark patterns formed at equal intervals in first periods, an absolute track with absolute patterns representing absolute positions, and a second incremental track with second incremental patterns including second light and dark patterns formed at equal intervals in second periods longer than the first periods;
a light source emitting a measurement light to the scale;
a photodetector receiving the measurement light reflected at or transmitted through the scale; and
a signal processing circuit processing the received light signal of the photodetector to detect an absolute position of the scale,
wherein the absolute patterns and the second incremental patterns are formed on the same track, and the second incremental patterns and the absolute patterns are integrated, and
wherein the integration of the second incremental patterns with the absolute patterns is performed in such a way that patterns are formed only in those regions where both the absolute patterns and the second incremental patterns exist.

2. The absolute position encoder according to claim 1, wherein the signal processing circuit determines which one of the periods of the reference position signal the scale is located in based on a signal obtained from the absolute patterns, and detects an absolute position of the scale based on the determination result, a signal obtained from the second incremental patterns, and a signal obtained from the first incremental patterns.

3. The absolute position encoder according to claim 2, wherein the integration of the second incremental patterns with the absolute patterns is performed in such a way that patterns are formed only in those regions where both the absolute patterns and the second incremental patterns exist.

4. An absolute position encoder comprising:
a scale having formed therein a first incremental track with first incremental patterns including first light and dark patterns formed at equal intervals in first periods,
an absolute track with absolute patterns representing absolute positions, and
two second incremental tracks, each with a second incremental pattern including second light and dark patterns formed at equal intervals in second periods longer than the first periods, wherein one second incremental track is arranged on an upper side of the first incremental track and the other second incremental track is arranged on a lower side of the first incremental track;
a light source emitting a measurement light to the scale;
a photodetector receiving the measurement light reflected at or transmitted through the scale; and
a signal processing circuit processing the received light signal of the photodetector to detect an absolute position of the scale,
wherein the absolute patterns are formed on the same tracks with each second incremental track, and the second incremental patterns and the absolute patterns are integrated.

5. The absolute position encoder according to claim 4, wherein the integration of the second incremental patterns with the absolute patterns is performed in such a way that patterns are formed only in those regions where both the absolute patterns and the second incremental patterns exist.

6. The absolute position encoder according claim 4, wherein the signal processing circuit determines which one of the periods of the reference position signal the scale is located in based on a signal obtained from the absolute patterns, and detects an absolute position of the scale based on the determination result, an average of signals obtained from the second incremental patterns, and a signal obtained from the first incremental patterns.

7. The absolute position encoder according to claim 6, wherein the integration of the second incremental patterns with the absolute patterns is performed in such a way that patterns are formed only in those regions where both the absolute patterns and the second incremental patterns exist.

* * * * *

UNITED STATES PATENT AND TRADEMARK OFFICE
CERTIFICATE OF CORRECTION

| | | |
|---|---|---|
| PATENT NO. | : 7,663,093 B2 | Page 1 of 1 |
| APPLICATION NO. | : 12/141529 | |
| DATED | : February 16, 2010 | |
| INVENTOR(S) | : Kusano | |

It is certified that error appears in the above-identified patent and that said Letters Patent is hereby corrected as shown below:

In Column 12, Line 38, in Claim 6, after "according" insert -- to --.

Signed and Sealed this

Twentieth Day of April, 2010

David J. Kappos
*Director of the United States Patent and Trademark Office*